(12) United States Patent
Guan et al.

(10) Patent No.: US 12,333,373 B2
(45) Date of Patent: Jun. 17, 2025

(54) CARD READER WITH A PROTECTIVE MECHANISM

(71) Applicant: Cheng Uei Precision Industry Co., LTD., New Taipei (TW)

(72) Inventors: Xiao-Xiang Guan, Dong-Guan (CN); Ming-Wei Lee, New Taipei (TW); Jin-Huai Mo, Dong-Guan (CN); Wei-Jian Wen, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/646,689

(22) Filed: Apr. 25, 2024

(65) Prior Publication Data
US 2025/0111174 A1    Apr. 3, 2025

(30) Foreign Application Priority Data
Sep. 28, 2023    (CN) .......................... 202322673013.2

(51) Int. Cl.
*G06K 7/08*    (2006.01)
*G06K 7/00*    (2006.01)

(52) U.S. Cl.
CPC .................................. *G06K 7/006* (2013.01)

(58) Field of Classification Search
CPC ..... G06K 7/0004; G06K 7/006; G06K 7/0056
USPC ................................................. 235/451, 453
See application file for complete search history.

(56) References Cited

U.S. PATENT DOCUMENTS

| 6,042,010 | A | * | 3/2000 | Kanayama | G06K 7/084 |
| | | | | | 235/379 |
| 8,202,125 | B2 | * | 6/2012 | Li | G06K 7/0021 |
| | | | | | 439/946 |
| 2010/0267256 | A1 | * | 10/2010 | Eriguchi | H01R 12/724 |
| | | | | | 439/83 |
| 2014/0191034 | A1 | * | 7/2014 | Glanzer | G06F 1/1628 |
| | | | | | 235/449 |
| 2018/0285604 | A1 | * | 10/2018 | Miyazawa | H05K 1/0275 |
| 2022/0207848 | A1 | * | 6/2022 | Islamov | G06T 19/006 |

FOREIGN PATENT DOCUMENTS

| CN | 206710607 | * | 12/2017 | G01S 19/14 |
| CN | 112233345 | * | 1/2021 | G07G 1/12 |
| CN | 218828095 U | | 4/2023 | |
| EP | 1950693 | * | 7/2008 | G06K 13/08 |

* cited by examiner

*Primary Examiner* — Daniel St. Cyr
(74) *Attorney, Agent, or Firm* — Cheng-Ju Chiang

(57) ABSTRACT

A card reader with a protective mechanism includes an upper shell, a lower shell disposed to a bottom surface of the upper shell, a protective mechanism and a circuit board assembly disposed between the upper shell and the lower shell. The protective mechanism includes a front cover, a rear cover covered to a rear of the front cover, two rollers disposed along an up-down direction, two springs, two supporting structures and a plurality of sealing structures. The two springs elastically abut between an inner surface of a top wall of the front cover and one roller along a vertical direction. The two supporting structures are mounted around two opposite sides of the one roller, and two opposite sides of the other roller. The plurality of the sealing structures are disposed at two outer surfaces of the two supporting structures.

20 Claims, 14 Drawing Sheets

CARD READER WITH A PROTECTIVE MECHANISM

CROSS-REFERENCE TO RELATED APPLICATION

The present application is based on, and claims priority from, China Patent Application No. 202322673013.2, filed Sep. 28, 2023, the disclosure of which is hereby incorporated by reference herein in its entirety.

BACKGROUND OF THE INVENTION

Field of the Invention

The present invention generally relates to a card reader, and more particularly to a card reader with a protective mechanism which is able to increase a usage life, conveniently replace a protective mechanism and prevent extraneous materials from invading into the card reader with the protective mechanism.

Description of the Prior Art

Generally, a conventional card reader has a larger inserting slot, so that extraneous materials including dusts, liquids or chippings are easily to enter an inside of the conventional card reader from the inserting slot. When the extraneous materials invade an electronic component of the conventional card reader or a circuit board of the conventional card reader, the electronic component of the conventional card reader or the circuit board of the conventional card reader will be broken.

A conventional POS (Point of Sale) machine is usually equipped with the conventional card reader. The conventional POS (Point of Sale) machine includes a base body. The base body has a shell, an IC (Integrated Circuit) card holder disposed in the shell, and the electronic component disposed in the shell. The shell has a first inserting slot. The IC card holder has a second inserting slot. The first inserting slot is corresponding to the second inserting slot. A sealing element is disposed between the first inserting slot and the second inserting slot. The first inserting slot is blocked by the sealing element. The sealing element has an upper sealing part and a lower sealing part. The upper sealing part and the lower sealing part are flexible and deformable, and the upper sealing part and the lower sealing part are able to recover automatically. The upper sealing part is able to abut against the lower sealing part. When a card is inserted into the base body from the first inserting slot, the card abuts against the upper sealing part and the lower sealing part, the upper sealing part and the lower sealing part are separated to form a third inserting slot. The third inserting slot of the sealing element is corresponding to the second inserting slot of the IC card holder. The card passes through the third inserting slot, and then the card passes through the second inserting slot. When the card is pulled out, the upper sealing part and the lower sealing part recover automatically, and the upper sealing part and the lower sealing part abut against each other.

However, the upper sealing part and the lower sealing part are directly disposed to an inner wall of a front shell of the shell, the upper sealing part and the lower sealing part are made of materials which are flexible and deformable, and are able to recover automatically, after the upper sealing part and the lower sealing part are used for a long time, the upper sealing part and the lower sealing part are easily deformed, and the upper sealing part and the lower sealing part are difficultly changed. In addition, the electronic component of the conventional POS machine is disposed adjacent to the third inserting slot between the upper sealing part and the lower sealing part, and the second inserting slot is adjacent to the third inserting slot, after the card passes through the third inserting slot of the sealing element, the card passes through a shorter route to be inserted to the second inserting slot of the IC card holder, consequently, the card and the sealing element easily collide with the electronic component to cause a damage of the card and the conventional POS machine. As a result, the conventional POS machine reduces a usage life.

Thus, it is essential to provide an innovative card reader with a protective mechanism. The innovative card reader with the protective mechanism is able to increase a usage life, conveniently replace a protective mechanism and prevent extraneous materials from invading into the card reader with the protective mechanism.

BRIEF SUMMARY OF THE INVENTION

An object of the present invention is to provide a card reader with a protective mechanism which is able to increase a usage life, conveniently change a protective mechanism and prevent extraneous materials invading into the card reader with the protective mechanism. The card reader with the protective mechanism includes an upper shell, a lower shell, a protective mechanism and a circuit board assembly. A bottom of the upper shell is opened freely. The upper shell has an inserting passageway longitudinally penetrating through a front end of the upper shell. The lower shell is disposed to a bottom surface of the upper shell to form an accommodating space between the upper shell and the lower shell. The accommodating space is communicated with the inserting passageway. The protective mechanism is disposed between the upper shell and the lower shell, and the protective mechanism is accommodated in the accommodating space. The protective mechanism has a front cover, a rear cover, two rollers received in the front cover and disposed along an up-down direction, two springs, two supporting structures and a plurality of sealing structures. The front cover has a top wall, a bottom wall, and an isolating wall connected with two inner surfaces of the top wall and the bottom wall. Two opposite sides of a rear surface of the isolating wall extend rearward to form two isolating ribs, respectively. Two opposite sides of a rear surface of the top wall, two opposite sides of a rear surface of the bottom wall and two inner sides of two rear surfaces of the two isolating ribs are recessed inward to form a plurality of restricting slots. The front cover has a first inserting slot penetrating through a middle of a front surface and a rear surface of the front cover. The rear cover is covered to a rear of the front cover. A middle of the rear cover has a second inserting slot penetrating through a front surface and a rear surface of the rear cover. The two springs elastically abut between two sides of the inner surface of the top wall of the front cover and two opposite sides of one roller along a vertical direction. The two rollers are driven by the two springs along the vertical direction. The one roller abuts against the other roller along the vertical direction to form an abutting position between the two rollers, or the one roller is separated from the other roller along the vertical direction to form an inserting space between the two rollers. The two supporting structures are mounted around the two opposite sides of the one roller, and two opposite sides of the other roller. The plurality of the sealing structures are disposed at two outer surfaces of the two supporting structures. The plurality of the sealing structures are fastened in the plurality of the restricting slots. The two rollers, the two springs, the two supporting structures and the plurality of the sealing structures are disposed between the front cover and the rear cover. The circuit board assembly is disposed between the upper shell and the lower shell, and the circuit board assembly is accommodated in the accommodating space. The protective mechanism is disposed to a front end of the circuit board assembly. The circuit board assembly has a clamping slot penetrating through a middle of a front of the circuit board assembly. The clamping slot is corresponding to the second inserting slot, the abutting position or the inserting space between the two rollers, the first inserting slot and the inserting passageway.

Another object of the present invention is to provide a card reader with a protective mechanism. The card reader with the protective mechanism includes a shell, a protective mechanism and a circuit board assembly. A front end of the shell has an inserting passageway longitudinally penetrating through a front surface of the shell. The protective mechanism is enclosed by the shell. A front end of the protective mechanism surrounds a rear end of the inserting passageway. The protective mechanism has a front cover, a rear cover, two rollers, two springs and two supporting structures. The front cover has a first inserting slot penetrating through a middle of a front surface and a rear surface of the front cover. Two front ends of an upper wall and a lower wall of the first inserting slot slantwise extend inward and rearward to form two bevels. The rear end of the inserting passageway is located to two fronts of the two bevels. The rear cover is covered to a rear of the front cover. A middle of the rear cover has a second inserting slot penetrating through a front surface and a rear surface of the rear cover. The two rollers are disposed between the front cover and the rear cover. The two rollers include an upper roller and a lower roller which are disposed along an up-down direction. The upper roller has an upper main portion. Two middles of two opposite side surfaces of the upper main portion extend outward to form two upper fastening pillars, respectively. The lower roller has a lower main portion. Two middles of two opposite side surfaces of the lower main portion extend outward to form two lower fastening pillars, respectively. The two springs are disposed between the front cover and the rear cover. The two springs elastically abut between two sides of an inner surface of a top of the front cover and the two upper fastening pillars. The two supporting structures are disposed between the front cover and the rear cover. Each supporting structure has an upper penetrating groove, and a lower penetrating groove disposed under the upper penetrating groove. Two upper portions of two rear surfaces of the two supporting structures are recessed inward to form two upper penetrating grooves. Two lower portions of the two rear surfaces of the two supporting structures are recessed inward to form two lower penetrating grooves. The two upper fastening pillars pass through the two upper penetrating grooves. Two opposite side surfaces of the upper main portion abut against two upper portions of two inner surfaces of the two supporting structures. The two lower fastening pillars pass through the two lower penetrating grooves. Two opposite side surfaces of the lower main portion abut against two lower portions of the two inner surfaces of the two supporting structures. The circuit board assembly is enclosed by the shell. The protective mechanism is disposed to a front end of the circuit board assembly. The circuit board assembly has a clamping slot penetrating through a middle of a front of the circuit board assembly.

When a card is without being inserted into the card reader with the protective mechanism, the lower main portion of the lower roller contacts with the upper main portion of the upper roller along the up-down direction, the two rollers are blocked between the first inserting slot and the second inserting slot, the two springs being located at original statuses. When the card is inserted into the card reader with the protective mechanism, the card is inserted into the inserting passageway, and the card passes through the first inserting slot, the card resists against the upper roller to make the upper roller move upward, the upper roller is separated from the lower roller to form an inserting space between the upper roller and the lower roller, the two springs are compressed by the upper roller, the clamping slot is communicated with the inserting passageway, the first inserting slot, the inserting space and the second inserting slot, the clamping slot is in alignment with the inserting passageway, the first inserting slot, the inserting space and the second inserting slot, the card is inserted into the clamping slot.

Another object of the present invention is to provide a card reader with a protective mechanism. The card reader with the protective mechanism includes a shell, a protective mechanism and a circuit board assembly. A front end of the shell has an inserting passageway penetrating through the shell. The protective mechanism is disposed in the shell. A front end of the protective mechanism surrounds a rear end of the inserting passageway. The protective mechanism has a front cover, a rear cover, an elastic unit and two rollers. The front cover has an inserting end penetrating through a front surface of the front cover, an outlet end penetrating through the rear surface of the front cover, and a first inserting slot defined in the front cover and communicated between the inserting end and the outlet end. The rear cover covers the outlet end. The rear cover has a second inserting slot penetrating through a front surface and a rear surface of the rear cover. The elastic unit is disposed in the outlet end. The two rollers are disposed in the outlet end along an up-down direction. The elastic unit elastically abuts between an inner surface of a top of the front cover and one roller along a vertical direction. The two rollers are disposed between the first inserting slot and the second inserting slot. The two rollers are driven by the elastic unit to abut against each other or be separated from each other. The two rollers abut against each other along the vertical direction to form an abutting position between the two rollers to isolate the first inserting slot from the second inserting slot, or the two rollers are separated from each other along the vertical direction to form an inserting space between the two rollers. The circuit board assembly is disposed in the shell. The circuit board assembly is disposed to a rear end of the protective mechanism. The circuit board assembly has a clamping slot. The clamping slot is located behind the protective mechanism. The clamping slot is corresponding to the second inserting slot, the outlet end, the abutting position or the inserting space between the two rollers, the first inserting slot, and the inserting passageway, when the two rollers are separated from each other, the clamping slot is communicated with the inserting passageway, the first inserting slot, the outlet end, the inserting space and the second inserting slot.

As described above, the card reader with the protective mechanism is conveniently maintained by removing the lower shell to replace the two rollers, rear ends of an upper extending portion and a lower extending portion of the upper shell are surrounded by the front cover, the inserting passageway of the upper shell, the first inserting slot and the second inserting slot are fastened to the front cover to make the inserting passageway, the first inserting slot and the second inserting slot have fastened positions, so an insertion position deviation of the card is prevented to prevent the card reader with the protective mechanism colliding with the card to affect a usage life. Furthermore, the protective mechanism is disposed to the front end of the circuit board assembly to make the circuit board assembly be away from the inserting space of the two rollers which is disposed in the shell, after the card passes through the inserting space, the card passes through a longer route to be inserted to the clamping slot by the shell, and the shell blocks an electronic component of the circuit board assembly from contacting the card, consequently, the card and the two rollers hardly collide with the electronic component to cause a damage of the card. In addition, when the card is inserted into the card reader with the protective mechanism, the two springs are compressed by the upper roller, the upper roller moves upward, the upper roller rotates anticlockwise, and the lower roller rotates clockwise, so a friction between the two rollers and the card is reduced. As a result, the card reader with the protective mechanism is able to increase the usage life of the card reader with the protective mechanism, conveniently replace the protective mechanism and prevent the extraneous materials invading into the card reader with the protective mechanism.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
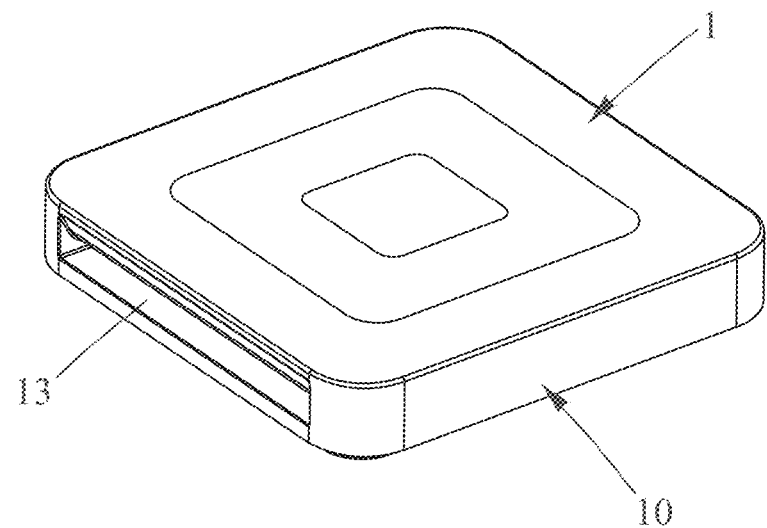
FIG. 1 is a perspective view of a card reader with a protective mechanism according to a preferred embodiment of the present invention.
Figure 2:
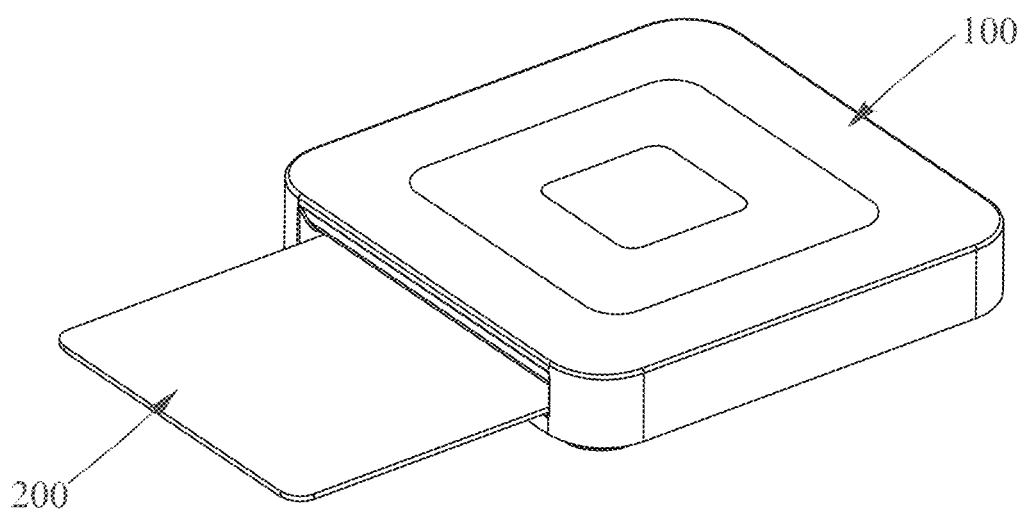
FIG. 2 is another perspective view of the card reader with the protective mechanism of FIG. 1, wherein a card is inserting into the card reader with the protective mechanism.
Figure 3:
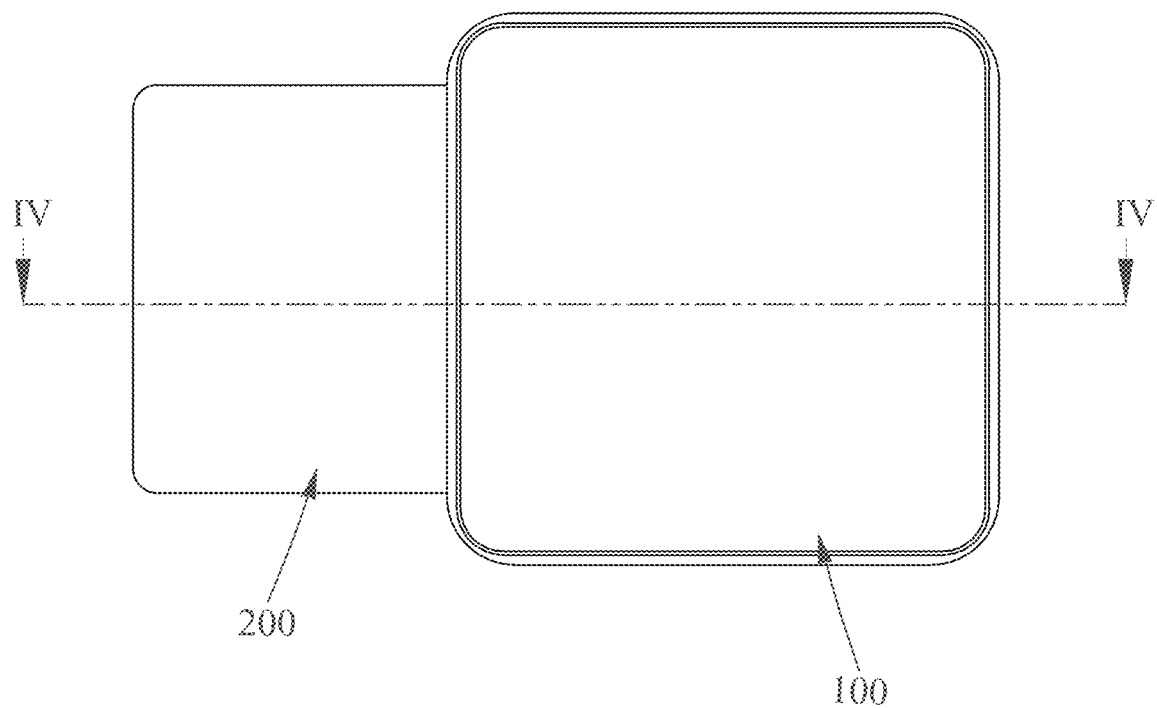
FIG. 3 is a diagrammatic drawing of the card reader with the protective mechanism of FIG. 1, wherein the card is inserting into the card reader with the protective mechanism.
Figure 4:
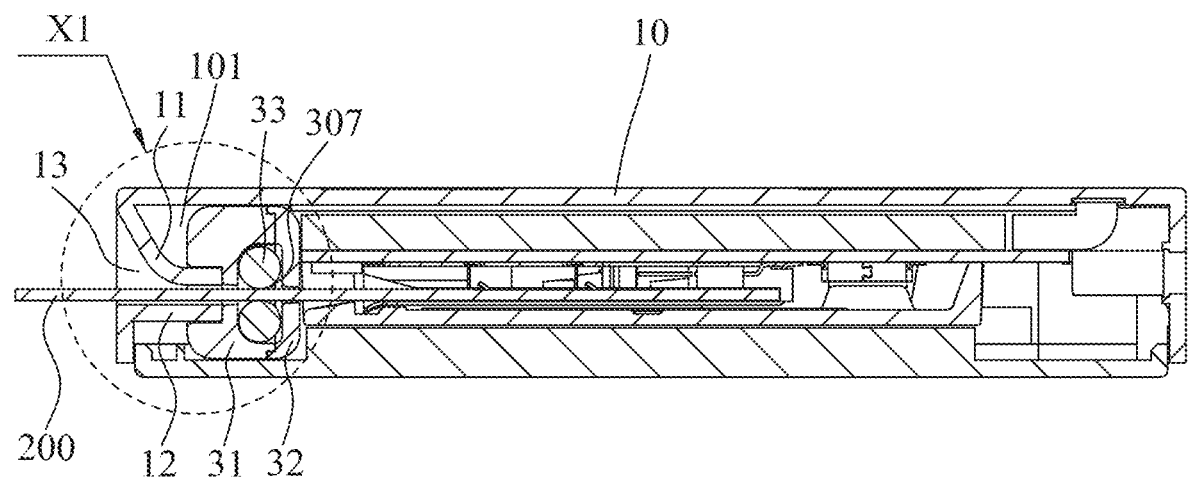
FIG. 4 is a sectional diagram of the card reader with the protective mechanism along a line IV-IV of FIG. 3.
Figure 5:
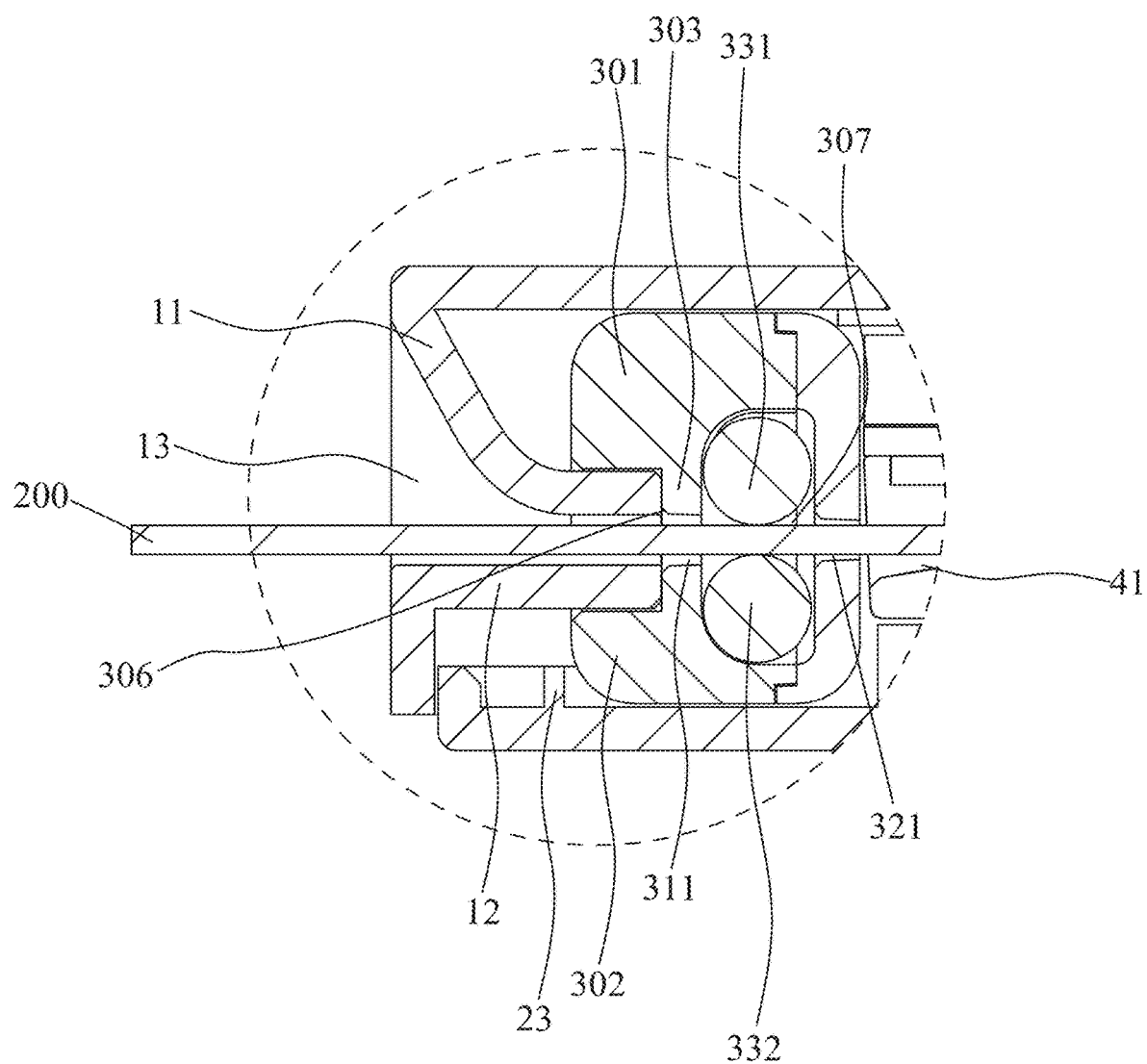
FIG. 5 is an enlarged diagram of an encircled portion X1 of the card reader with the protective mechanism of FIG. 4.
Figure 6:
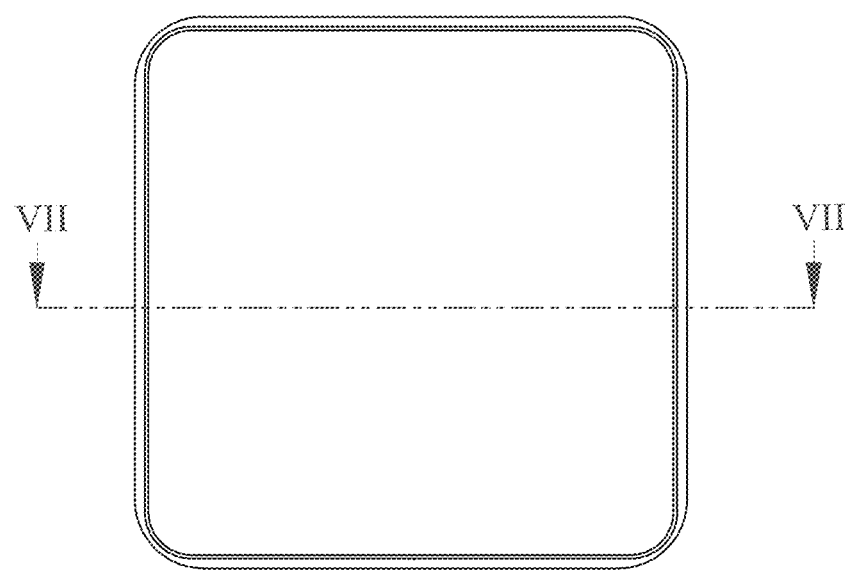
FIG. 6 is another diagrammatic drawing of the card reader with the protective mechanism, wherein the card is drawn out from the card reader with the protective mechanism.
Figure 7:
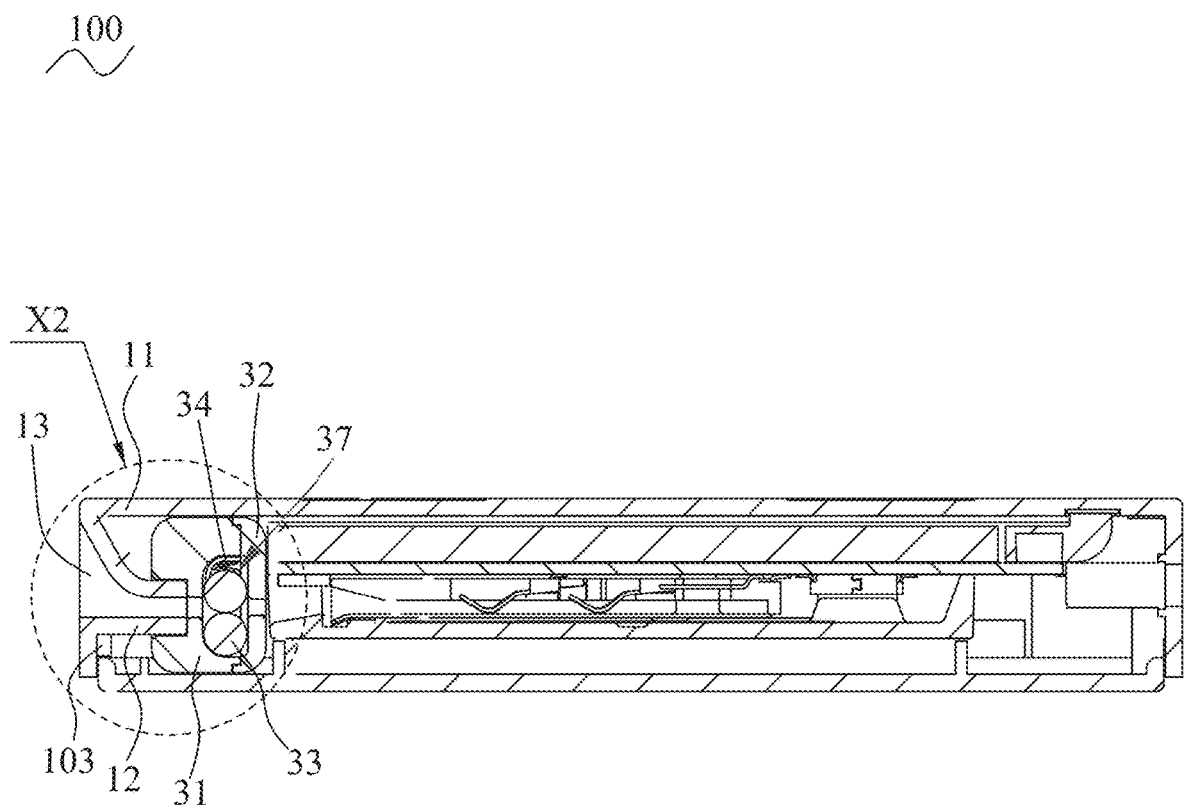
FIG. 7 is a sectional diagram of the card reader with the protective mechanism along a line VII-VII of FIG. 6.
Figure 8:
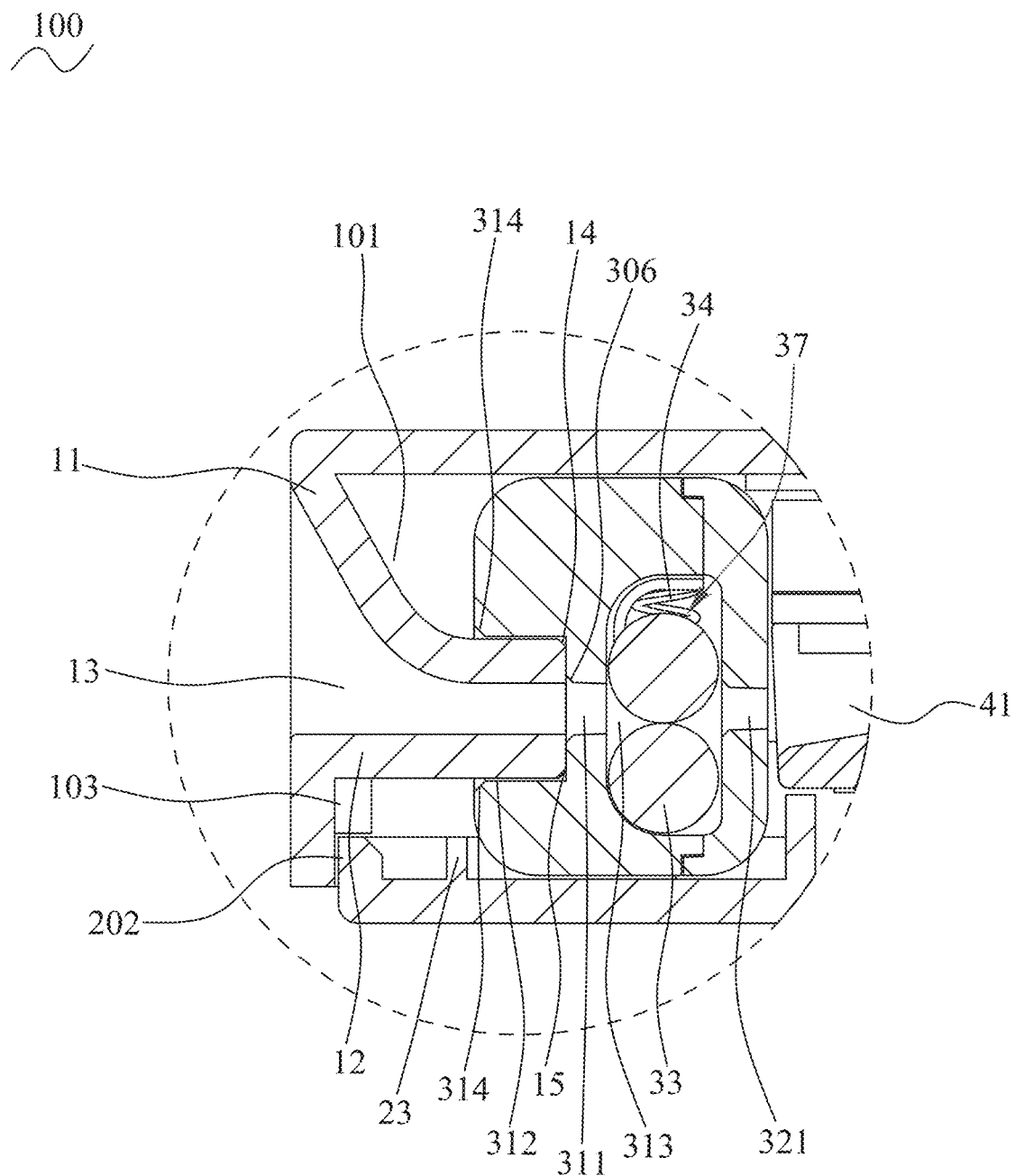
FIG. 8 is an enlarged diagram of an encircled portion X2 of the card reader with the protective mechanism of FIG. 7.
Figure 9:
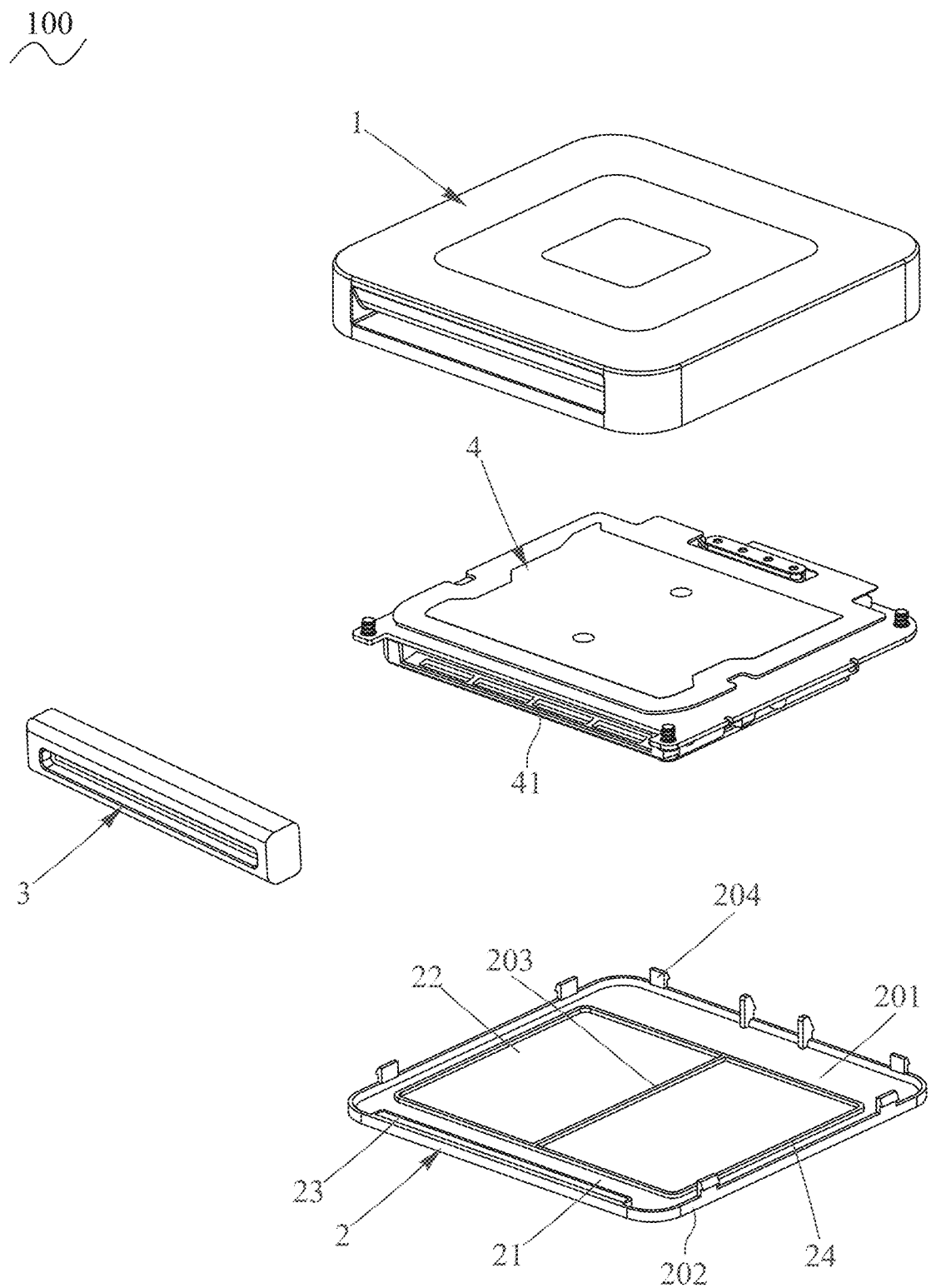
FIG. 9 is an exploded view of the card reader with the protective mechanism according to the preferred embodiment of the present invention.

With reference to FIG. 1 to FIG. 9, a card reader with a protective mechanism 100 according to a preferred embodiment of the present invention is shown. The card reader with the protective mechanism 100 includes an upper shell 1, a lower shell 2, a protective mechanism 3 and a circuit board assembly 4.

The upper shell 1 is shown as a cuboid shape. The upper shell 1 is hollow. A bottom of the upper shell 1 is opened freely. The lower shell 2 is mounted to a bottom surface of the upper shell 1 to form an accommodating space 101 between the upper shell 1 and the lower shell 2. The protective mechanism 3 is disposed between the upper shell 1 and the lower shell 2, and the protective mechanism 3 is accommodated in the accommodating space 101. The circuit board assembly 4 is disposed between the upper shell 1 and the lower shell 2, and the circuit board assembly 4 is accommodated in the accommodating space 101. The protective mechanism 3 is disposed to a front end of the circuit board assembly 4. In the preferred embodiment, the circuit board assembly 4 is disposed to a rear end of the protective mechanism 3. A card 200 is inserted into the circuit board assembly 4 through the upper shell 1 and the protective mechanism 3. The upper shell 1 and the lower shell 2 are buckled with each other to form a shell 10, so the shell 10 includes the upper shell 1 and the lower shell 2. An inside of the shell 10 defines the accommodating space 101. The protective mechanism 3 is disposed in the shell 10. The protective mechanism 3 is enclosed by the shell 10. The circuit board assembly 4 is disposed in the shell 10. The circuit board assembly 4 is enclosed by the shell 10.

Referring to FIG. 1 to FIG. 12, a front end of the upper shell 1 includes an upper extending portion 11, a lower extending portion 12 and an inserting passageway 13. An upper portion of the front end of the upper shell 1 slantwise extends downward and rearward, and then is bent rearward to form the upper extending portion 11. The upper extending portion 11 abuts against an upper corresponding construction of the protective mechanism 3 to realize that the upper shell 1 is located to the protective mechanism 3, and the upper shell 1 is fastened to the protective mechanism 3. A lower portion of the front end of the upper shell 1 extends rearward to form the lower extending portion 12. The upper extending portion 11 and the lower extending portion 12 project into the shell 10. The lower extending portion 12 abuts against a lower corresponding construction of the protective mechanism 3 to realize that the upper shell 1 is located to the protective mechanism 3, and the upper shell 1 is fastened to the protective mechanism 3. Several portions of an inner peripheral surface of the upper shell 1 are recessed and opposite to the circuit board assembly 4 to form a plurality of buckling grooves 102. Several portions of two inner surfaces of two sides of the upper shell 1 protrude inward to form a plurality of limiting blocks 104 extending along an up-down direction.

The inserting passageway 13 longitudinally penetrates through the front end of the upper shell 1. A front end of the shell 10 has the inserting passageway 13 longitudinally penetrating through a front surface of the shell 10. The accommodating space 101 is communicated with the inserting passageway 13. The upper extending portion 11 is spaced from the lower extending portion 12 to form the inserting passageway 13 between the upper extending portion 11 and the lower extending portion 12. The inserting passageway 13 is corresponding to a corresponding construction of the protective mechanism 3. A front end of the protective mechanism 3 surrounds a rear end of the inserting passageway 13. Two sides of the upper extending portion 11 are bent downward, and two sides of the lower extending portion 12 are bent upward. The two sides of the upper extending portion 11 are connected with the two sides of the lower extending portion 12, respectively. Two outer surfaces of the two sides of the upper extending portion 11 are smoothly connected with two outer surfaces of the two sides of the lower extending portion 12. Two inner surfaces of the two sides of the upper extending portion 11 are smoothly connected with two inner surfaces of the two sides of the lower extending portion 12. Two sides of a bottom surface of the lower extending portion 12 protrude downward to form two protruding blocks 103 connected with an inner surface of a front of the upper shell 1.

An outer portion of a rear end of the upper extending portion 11 slantwise extends inward and rearward to form a first chamfer 14. The first chamfer 14 prevents the outer portion of the rear end of the upper extending portion 11 from colliding with the protective mechanism 3. The first chamfer 14 prevents the outer portion of the rear end of the upper extending portion 11 colliding with a front cover 31 of the protective mechanism 3, so a damage of the upper extending portion 11 of the upper shell 1 and the front cover 31 is prevented. An outer portion of a rear end of the lower extending portion 12 slantwise extends inward and rearward to form a second chamfer 15. The second chamfer 15 prevents the outer portion of the rear end of the lower extending portion 12 from colliding with the protective mechanism 3. The second chamfer 15 prevents the outer portion of the rear end of the lower extending portion 12 colliding with the front cover 31 of the protective mechanism 3, so a damage of the lower extending portion 12 of the upper shell 1 and the front cover 31 is prevented.

Referring to FIG. 9 to FIG. 12, the lower shell 2 and the upper shell 1 are rectangular, and the lower shell 2 is assembled to the bottom surface of the upper shell 1 to form a rectangular shape. The lower shell 2 includes a first mounting portion 21, a second mounting portion 22, a first supporting portion 23 and a second supporting portion 24. The lower shell 2 has a base board 201, and a peripheral wall 202 protruded upward from a periphery of the base board 201. A front end of a top surface of the base board 201 of the lower shell 2 extends upward to form the first supporting portion 23. The first supporting portion 23 is shown as a U shape. A mouth of the first supporting portion 23 faces an inner surface of a front of the peripheral wall 202 of the lower shell 2. Two free ends of the first supporting portion 23 are connected with the inner surface of the front of the peripheral wall 202 of the lower shell 2. Several portions of a top of the peripheral wall 202 protrude upward to form a plurality of buckling blocks 204. When the lower shell 2 is assembled to the bottom surface of the upper shell 1, the plurality of the buckling blocks 204 are buckled in the plurality of the buckling grooves 102 to fasten the lower shell 2 to the upper shell 1. The two protruding blocks 103 abut against a top of the front of the peripheral wall 202.

A middle of the top surface of the base board 201 of the lower shell 2 extends upward to form the second supporting portion 24. The second supporting portion 24 is a rectangle frame. A rear surface of the first supporting portion 23 is separated from a front surface of the second supporting portion 24 by a distance. The first mounting portion 21 is formed between the rear surface of the first supporting portion 23 and the front surface of the second supporting portion 24. The distance between the rear surface of the first supporting portion 23 and the front surface of the second supporting portion 24 defines the first mounting portion 21. A middle of the second supporting portion 24 defines the second mounting portion 22. A middle of a front of the second supporting portion 24 is connected with a middle of a rear of the second supporting portion 24 by a dividing wall 203. The dividing wall 203 is disposed in a middle of the second mounting portion 22. The first mounting portion 21 is corresponding to the protective mechanism 3. The protective mechanism 3 is fastened in the first mounting portion 21 to realize that the protective mechanism 3 is located in the lower shell 2, and the protective mechanism 3 is fixed in the lower shell 2.

The second mounting portion 22 is corresponding to the circuit board assembly 4. The circuit board assembly 4 is disposed to the second mounting portion 22 to realize that the circuit board assembly 4 is located to the lower shell 2, and the circuit board assembly 4 is fixed to the lower shell 2. The first supporting portion 23 is disposed under the lower extending portion 12 of the upper shell 1. The first supporting portion 23 is used for locating the lower extending portion 12 of the upper shell 1, and the first supporting portion 23 is used for supporting the lower extending portion 12 of the upper shell 1.

The second supporting portion 24 is disposed under a top of the circuit board assembly 4. The top of the circuit board assembly 4 is located to a top of the second supporting portion 24, and a bottom of the circuit board assembly 4 is received inside the second supporting portion 24. The second supporting portion 24 is used for locating the circuit board assembly 4, and the second supporting portion 24 is used for supporting the circuit board assembly 4. An electronic element (not labeled) of the bottom of the circuit board assembly 4 is disposed in the second mounting portion 22. An electronic component (not labeled) of the circuit board assembly 4 is accommodated in the accommodating space 101. In the preferred embodiment, the lower shell 2 is detachable from the upper shell 1 of the card reader with the protective mechanism 100 to conveniently replace corresponding structures of the protective mechanism 3.

Referring to FIG. 3 to FIG. 11, the protective mechanism 3 includes the front cover 31, a rear cover 32 covered to a rear of the front cover 31, two rollers 33 disposed along the up-down direction, an elastic unit 37 which includes two springs 34, two supporting structures 35 and a plurality of sealing structures 36. The elastic unit 37 is disposed between the front cover 31 and the rear cover 32. The two rollers 33, the two springs 34, the two supporting structures 35 and the plurality of the sealing structures 36 are disposed between the front cover 31 and the rear cover 32. The two rollers 33 include an upper roller 331 and a lower roller 332. The upper roller 331 and the lower roller 332 of the two rollers 33 are disposed along the up-down direction. A middle of each roller 33 is cylindrical. Two opposite sides of each roller 33 are cylindrical. A diameter of a circular surface of the middle of each roller 33 is larger than a diameter of a circular surface of each side of the roller 33. The two opposite sides and two middles of two opposite side surfaces of the middle of each roller 33 are connected. The two springs 34 are disposed to two opposite sides of one roller 33. The two springs 34 abut against the two opposite sides of the one roller 33 along a vertical direction. The two rollers 33 are driven by the two springs 34 along the vertical direction. The one roller 33 abuts against the other roller 33 along the vertical direction to form an abutting position between the two rollers 33, or the one roller 33 is separated from the other roller 33 along the vertical direction to form an inserting space 307 between the two rollers 33. In the preferred embodiment, the upper roller 331 and the lower roller 332 are made of rigid materials which include rigid plastic materials, metal materials, glasses and ceramic materials.

The two supporting structures 35 are mounted around the two opposite sides of the one roller 33, and two opposite sides of the other roller 33. The plurality of the sealing structures 36 are disposed at two outer surfaces of the two supporting structures 35. The plurality of the sealing structures 36 are protruded outward from the two outer surfaces of the two supporting structures 35. Each sealing structure 36 is shown as a rectangular block shape. The plurality of the sealing structures 36 are used for preventing dusts, liquids or extraneous materials invading into the circuit board assembly 4 along the two opposite sides of each roller 33. When the two rollers 33 contact with the card 200 for a long time, the two rollers 33 are easily deformed. The two rollers 33 are replaceable to conveniently maintain the card reader with the protective mechanism 100 by removing the lower shell 2. The corresponding structures of the protective mechanism 3 are the two rollers 33.

Figure 10:
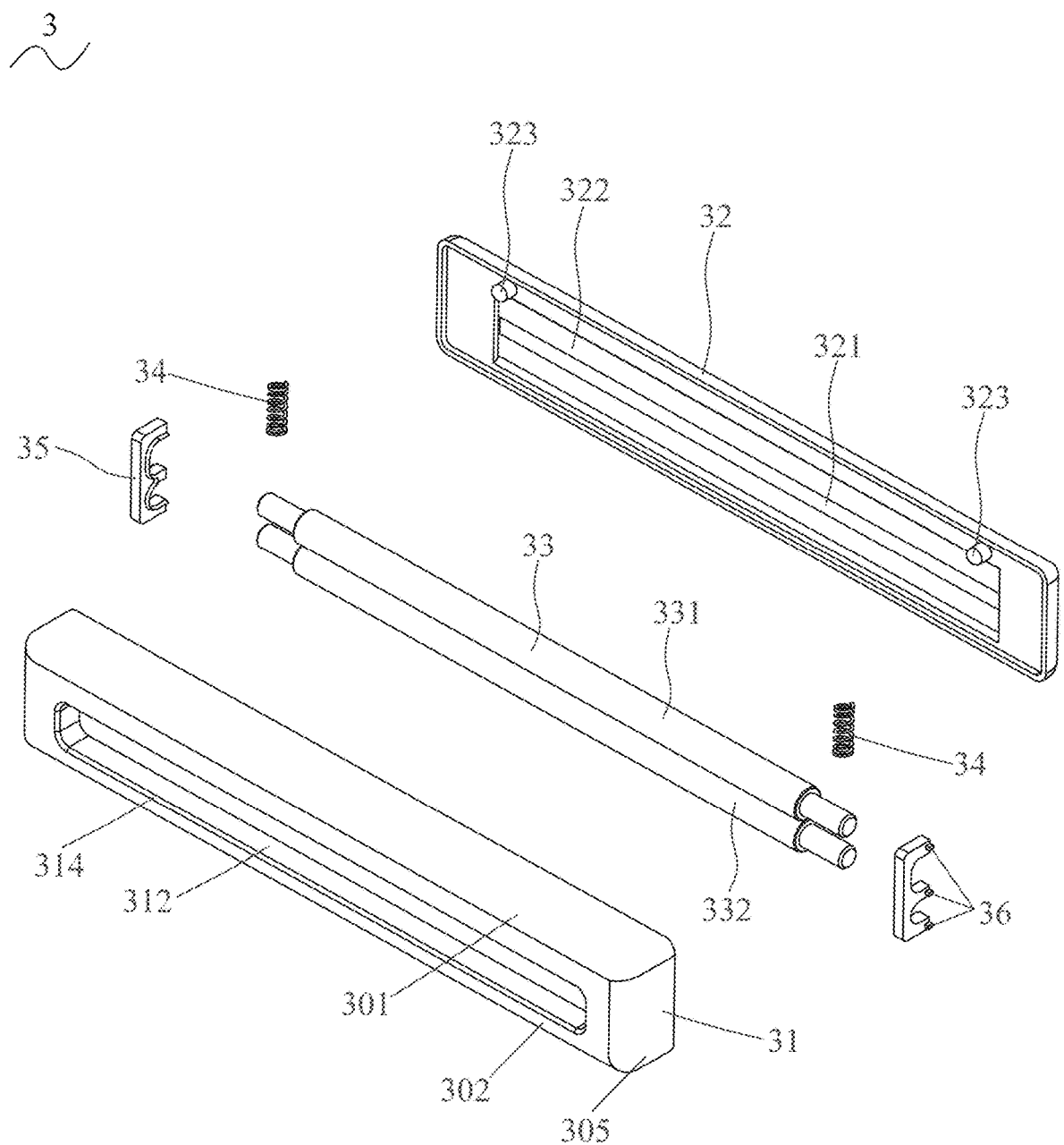
FIG. 10 is an exploded view of a protective mechanism of the card reader with the protective mechanism of FIG. 9.
Figure 11:
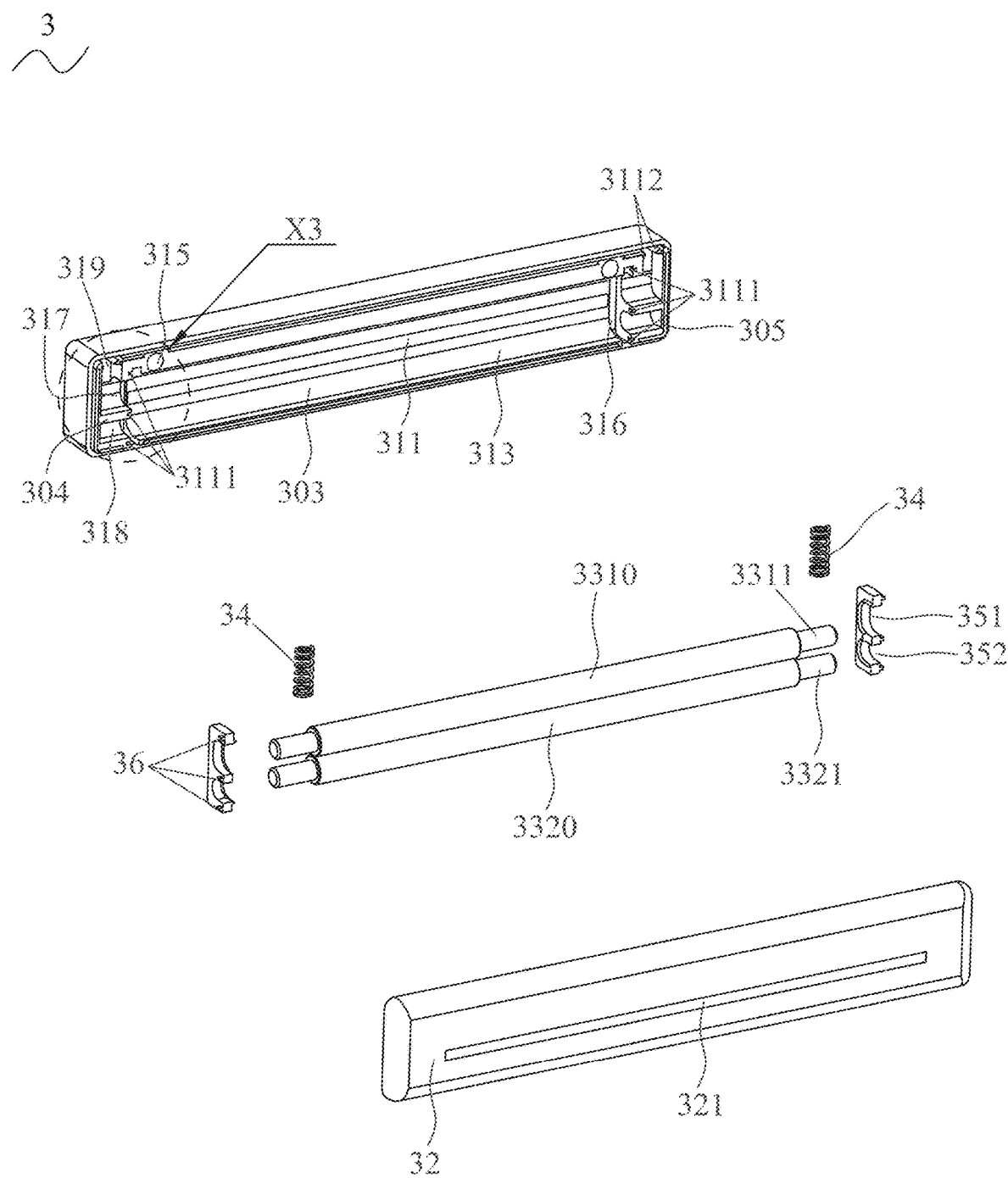
FIG. 11 is another exploded view of the protective mechanism of the card reader with the protective mechanism of FIG. 9.
Figure 12:
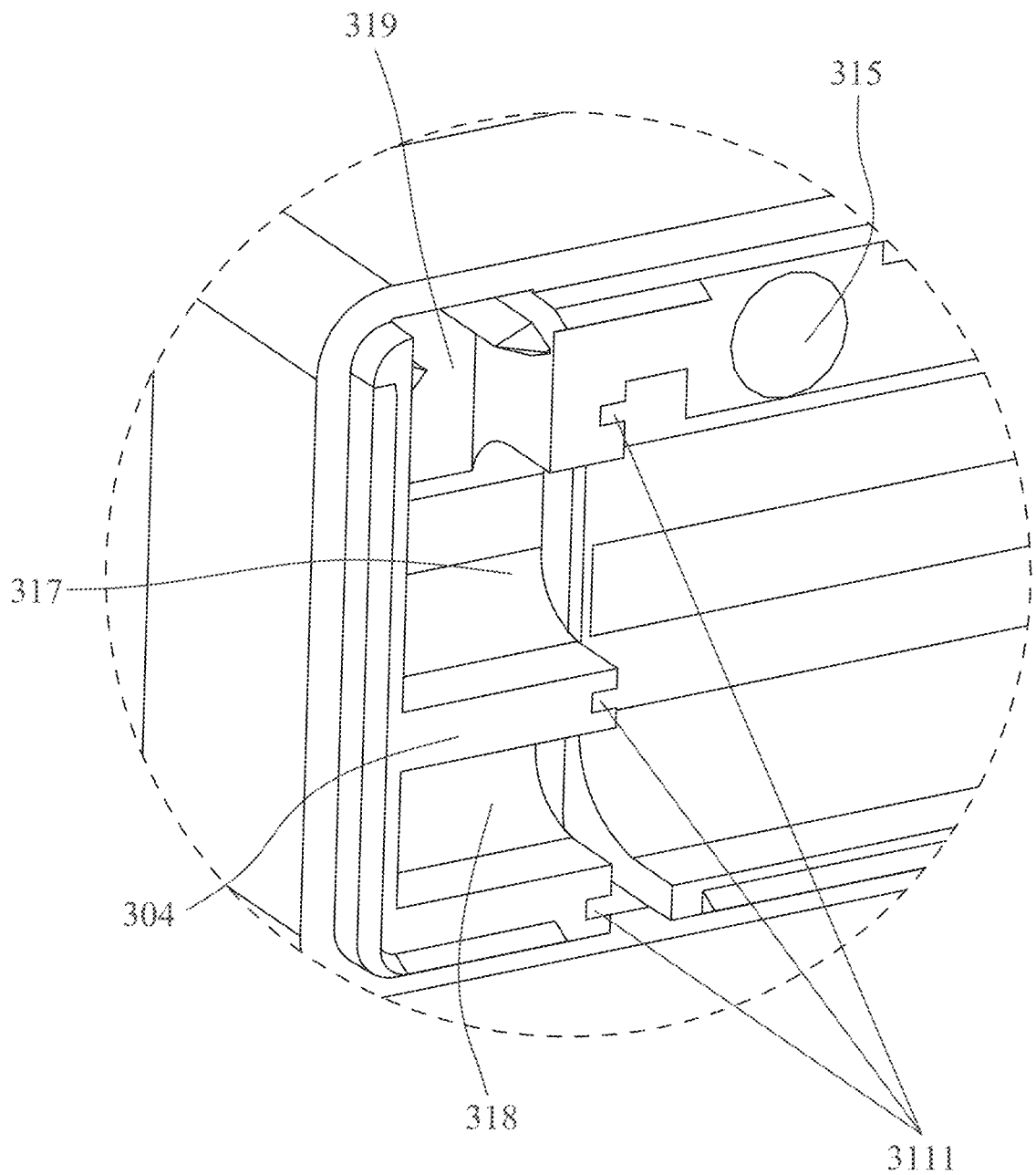
FIG. 12 is an enlarged view of an encircled portion X3 of the card reader with the protective mechanism of FIG. 11.
Figure 13:
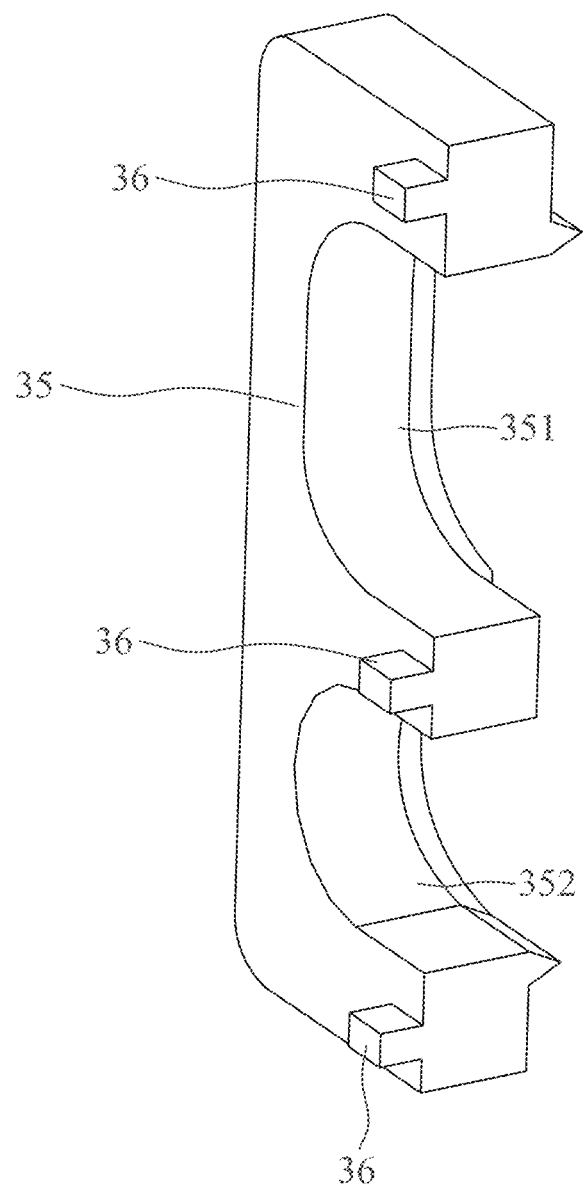
FIG. 13 is a perspective view of a supporting structure with a plurality of sealing structures of the card reader with the protective mechanism of FIG. 11.
Figure 14:
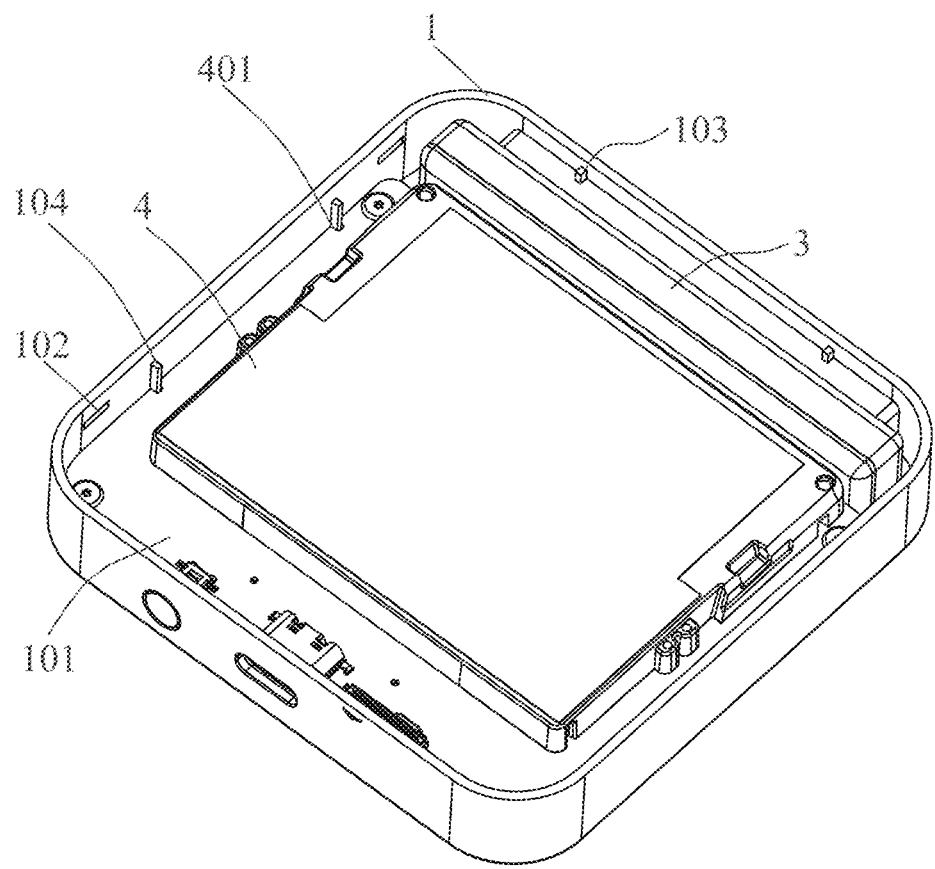
FIG. 14 is a partially assembling diagram of the card reader with the protective mechanism according to the preferred embodiment of the present invention.

Referring to FIG. 10 and FIG. 11, the front cover 31 has a top wall 301, a bottom wall 302, an isolating wall 303, two lateral walls 305, a first inserting slot 311, an inserting end 312 and an outlet end 313. The elastic unit 37 is disposed in the outlet end 313. The rear cover 32 covers the outlet end 313. The top wall 301 is disposed opposite to the bottom wall 302 along the up-down direction. The isolating wall 303 is connected with two inner surfaces of the top wall 301 and the bottom wall 302. The two lateral walls 305 are connected with two sides of the top wall 301 and two sides of the bottom wall 302. The first inserting slot 311 penetrates through a middle of a front surface and a rear surface of the front cover 31. The first inserting slot 311 extends in the isolating wall 303 along a transverse direction. Two front ends of an upper wall and a lower wall of the first inserting slot 311 slantwise extend inward and rearward to form two bevels 306. The two springs 34 elastically abut between two sides of the inner surface of the top wall 301 of the front cover 31 and the two opposite sides of the one roller 33 along the vertical direction. The elastic unit 37 elastically abuts between an inner surface of a top of the front cover 31 and the one roller 33 along the vertical direction.

Referring to FIG. 7 to FIG. 11, a front end of the front cover 31 defines the inserting end 312 penetrating through a front surface of the front cover 31. A rear end of the front cover 31 defines the outlet end 313 penetrating through a rear surface of the front cover 31. The inserting end 312 and the outlet end 313 are isolated by the isolating wall 303. The isolating wall 303 is located behind the inserting end 312, and the outlet end 313 is located behind the isolating wall 303. Front ends of the top wall 301, the bottom wall 302, the isolating wall 303 and the two lateral walls 305 define the inserting end 312. Rear ends of the top wall 301, the bottom wall 302, the isolating wall 303 and the two lateral walls 305 define the outlet end 313. The rear surface of the front cover 31 is recessed frontward to form the outlet end 313. The inserting passageway 13 of the upper shell 1 is communicated with the first inserting slot 311. The inserting end 312 is close to a rear end of the inserting passageway 13 of the upper shell 1. The outlet end 313 is close to the front end of the circuit board assembly 4.

The rear ends of the upper extending portion 11 and the lower extending portion 12 of the upper shell 1 are inserted into the inserting end 312 of the front cover 31. The upper extending portion 11 of the upper shell 1 abuts against an upper portion of an inner surface of the inserting end 312. The upper extending portion 11 of the upper shell 1 abuts against an upper portion of a front surface of the isolating wall 303 and the inner surface of the top wall 301. The lower extending portion 12 of the upper shell 1 abuts against a lower portion of the inner surface of the inserting end 312. The lower extending portion 12 of the upper shell 1 abuts against a lower portion of the front surface of the isolating wall 303 and the inner surface of the bottom wall 302. Two upper portions of two inner surfaces of the two lateral walls 305 cover the two outer surfaces of the two sides of the upper extending portion 11. Two lower portions of the two inner surfaces of the two lateral walls 305 cover the two outer surfaces of the two sides of the lower extending portion 12. The upper corresponding construction of the protective mechanism 3 is the upper portion of the inner surface of the inserting end 312. The lower corresponding construction of the protective mechanism 3 is the lower portion of the inner surface of the inserting end 312.

In the preferred embodiment, the bottom wall 302 is used for locating the lower extending portion 12 of the upper shell 1, and the bottom wall 302 is used for supporting the lower extending portion 12 of the upper shell 1. The rear ends of the upper extending portion 11 and the lower extending portion 12 of the upper shell 1 are surrounded by the front cover 31. Because the inserting passageway 13 of the upper shell 1 and the first inserting slot 311 are positioned in the front cover 31, the inserting passageway 13 of the upper shell 1 aligns with the first inserting slot 311. So the front cover 31 prevents a position deviation of the inserting passageway 13 of the upper shell 1 and a position deviation of the first inserting slot 311, and an insertion position deviation of the card 200 is prevented to prevent the card 200 colliding with the card reader with the protective mechanism 100 to affect a usage life.

A front end of an inner peripheral wall of the inserting end 312 slantwise extends inward and rearward to form a third chamfer 314. Specifically, front ends of inner surfaces of the top wall 301, the bottom wall 302, the two lateral walls 305 slantwise extend inward and rearward to form the third chamfer 314. The third chamfer 314 is corresponding to the first chamfer 14 and the second chamfer 15. The third chamfer 314 is matched with the first chamfer 14 and the second chamfer 15. The first chamfer 14, the second chamfer 15 and the third chamfer 314 guide the rear ends of the upper extending portion 11 and the lower extending portion 12 of the upper shell 1 into the inserting end 312. The third chamfer 314 prevents the front cover 31 colliding with the upper extending portion 11 and the lower extending portion 12 of the upper shell 1 to cause the damage of the front cover 31 and the upper extending portion 11 and the lower extending portion 12 of the upper shell 1.

Referring to FIG. 10 and FIG. 11, the front cover 31 has at least one location hole 315, two concave portions 316, two first fastening grooves 317, two second fastening grooves 318, two assembling grooves 319, a plurality of restricting slots 3111 and a plurality of fastening ridges 3112. In the preferred embodiment, the front cover 31 has two location holes 315. In the preferred embodiment, the two rollers 33 are disposed in the outlet end 313. Two opposite sides of a rear surface of the top wall 301 are recessed inward to form the two location holes 315, respectively. The two location holes 315 are corresponding to two corresponding sections of the rear cover 32 to realize that the front cover 31 is located to the rear cover 32, and the front cover 31 is fastened to the rear cover 32. Two opposite sides of a rear surface of the isolating wall 303 are recessed frontward to form the two concave portions 316, respectively. The two concave portions 316 extend upward to the inner surface of the top wall 301, and the two concave portions 316 extend downward to the inner surface of the bottom wall 302. The two concave portions 316 are connected with the inner surface of the top wall 301 and the inner surface of the bottom wall 302. The two concave portions 316 are communicated with the outlet end 313. The two supporting structures 35 are received in the two concave portions 316.

The two opposite sides of the rear surface of the isolating wall 303 extend rearward to form two isolating ribs 304, respectively. The two isolating ribs 304 are disposed to the rear surface of the isolating wall 303 along the transverse direction. Two areas between the top wall 301 and the two isolating ribs 304 define two first fastening grooves 317. Two areas between the bottom wall 302 and the two isolating ribs 304 define two second fastening grooves 318. The two second fastening grooves 318 are disposed under the two first fastening grooves 317. Two upper portions of the two opposite sides of the rear surface of the isolating wall 303 are recessed inward to form the two arc-shaped first fastening grooves 317. Two lower portions of the two opposite sides of the rear surface of the isolating wall 303 are recessed inward to form the two arc-shaped second fastening grooves 318. The first fastening groove 317 and the second fastening groove 318 of each side of the rear surface of the isolating wall 303 are isolated by one isolating rib 304.

The two first fastening grooves 317 are corresponding to two opposite sides of the upper roller 331. The two opposite sides of the upper roller 331 are disposed in the two first fastening grooves 317. The two second fastening grooves 318 are corresponding to the two opposite sides of the lower roller 332. The two opposite sides of the lower roller 332 are disposed in the two second fastening grooves 318. The two concave portions 316 are disposed between the first fastening grooves 317 and the second fastening grooves 318 of the two opposite sides of the rear surface of the isolating wall 303.

The two upper portions of two opposite sides of the rear surface of the top wall 301 are recessed inward to form the two assembling grooves 319, respectively. The two assembling grooves 319 are disposed to two tops of the two first fastening grooves 317. The two assembling grooves 319 are communicated with the two first fastening grooves 317. The two springs 34 are disposed in the two assembling grooves 319. In the preferred embodiment, the two springs 34 abut against the two opposite sides of the upper roller 331. The two opposite sides of the rear surface of the top wall 301, two opposite sides of a rear surface of the bottom wall 302 and two inner sides of two rear surfaces of the two isolating ribs 304 of the front cover 31 are recessed inward to form the plurality of the restricting slots 3111. The plurality of the restricting slots 3111 extend to two outer sides of the two concave portions 316. The plurality of the restricting slots 3111 are communicated with the two concave portions 316.

The plurality of the restricting slots 3111 are disposed at top end walls of the plurality of the first fastening grooves 317 and bottom end walls of the plurality of the second fastening grooves 318. The plurality of the restricting slots 3111 are corresponding to the plurality of the sealing structures 36. The plurality of the sealing structures 36 are fastened in the plurality of the restricting slots 3111. Two opposite inner side surfaces of each assembling groove 319 protrude inward to form two fastening ridges 3112, respectively. An upper portion and a lower portion of each fastening ridge 3112 gradually shrink inward from an outer side of the fastening ridge 3112 to an inner side of the fastening ridge 3112. When each assembling groove 319 is assembled with one spring 34, the two fastening ridges 3112 of each assembling groove 319 are fastened to one end of the one spring 34 to prevent the one spring 34 falling down from the two fastening ridges 3112, specifically, the two fastening ridges 3112 of each assembling groove 319 project into the one end of the one spring 34 to prevent the one spring 34 falling down from the two fastening ridges 3112.

The rear cover 32 is covered to the outlet end 313. The rear cover 32 has a second inserting slot 321, a concave surface 322 and at least one locating pillar 323. In the preferred embodiment, the rear cover 32 has two locating pillars 323. A middle of the rear cover 32 has the second inserting slot 321 penetrating through a front surface and a rear surface of the rear cover 32. The second inserting slot 321 extends in the middle of the rear cover 32 along the transverse direction. The second inserting slot 321 is corresponding to the outlet end 313, the abutting position or the inserting space 307 between the two rollers 33, the first inserting slot 311 of the front cover 31, the inserting end 312 and the inserting passageway 13 of the upper shell 1. The two rollers 33 are disposed between the first inserting slot 311 and the second inserting slot 321. The two rollers 33 are driven by the elastic unit 37 to abut against each other, and the two rollers 33 are driven by the card 200 to be separated from each other. The two rollers 33 abut against each other along the vertical direction to form the abutting position between the two rollers 33 to isolate the first inserting slot 311 from the second inserting slot 321, or the two rollers 33 are separated from each other along the vertical direction to form the inserting space 307 between the two rollers 33. A middle of a front surface of the rear cover 32 is recessed rearward to form the concave surface 322. The two rollers 33 are corresponding to the concave surface 322. Two sides of an upper portion of the front surface of the rear cover 32 extends frontward to form the two locating pillars 323. The two locating pillars 323 are located above the concave surface 322. The two locating pillars 323 are inserted into the two location holes 315 of the front cover 31 to realize that the front cover 31 is located to the rear cover 32, and the front cover 31 is fastened to the rear cover 32. The middle corresponding construction of the protective mechanism 3 is the first inserting slot 311 of the front cover 31, the abutting position or the inserting space 307 between the two rollers 33, and the second inserting slot 321. The two corresponding sections of the rear cover 32 are the two locating pillars 323.

In the preferred embodiment, the two springs 34 abut against the two opposite sides of the upper roller 331 along the vertical direction. In the concrete implementation, two opposite sides of the lower roller 332 are able to abut against the two springs 34 along the vertical direction. The upper roller 331 has an upper main portion 3310 and two upper fastening pillars 3311. The upper main portion 3310 is corresponding to an upper portion of the outlet end 313 of the front cover 31 and an upper portion of the concave surface 322 of the rear cover 32. Two middles of two opposite sides surfaces of the upper main portion 3310 extend outward to form the two upper fastening pillars 3311, respectively. The two springs 34 elastically abut between two sides of the inner surface of the top of the front cover 31 and the two upper fastening pillars 3311.

In the preferred embodiment, a diameter of two circular surfaces of the upper main portion 3310 is bigger than a diameter of a circular surface of each upper fastening pillar 3311. The two upper fastening pillars 3311 pass through two upper corresponding segments of the two supporting structures 35. The two opposite sides surfaces of the upper main portion 3310 abut against two upper portions of two inner surfaces of the two supporting structures 35. The two upper fastening pillars 3311 are disposed in the two first fastening grooves 317 of the front cover 31. In the preferred embodiment, the two upper fastening pillars 3311 abut against the two springs 34. The two springs 34 are mounted on the two upper fastening pillars 3311, and the two springs 34 abut against the two upper fastening pillars 3311 along the vertical direction.

Referring to FIG. 10 and FIG. 11, the lower roller 332 has a lower main portion 3320 and two lower fastening pillars 3321. The lower main portion 3320 is corresponding to a lower portion of the outlet end 313 of the front cover 31 and a lower portion of the concave surface 322 of the rear cover 32. Two middles of two opposite side surfaces of the lower main portion 3320 extend outward to form the two lower fastening pillars 3321, respectively. In the preferred embodiment, a diameter of two circular surfaces of the lower main portion 3320 is bigger than a diameter of a circular surface of each lower fastening pillar 3321. The two lower fastening pillars 3321 pass through two lower corresponding segments of the two supporting structures 35. The two opposite side surfaces of the lower main portion 3320 abut against two lower portions of the two inner surfaces of the two supporting structures 35. The two lower fastening pillars 3321 are disposed in the two second fastening grooves 318 of the front cover 31.

Each supporting structure 35 has an upper penetrating groove 351, and a lower penetrating groove 352 disposed under the upper penetrating groove 351. Two upper portions of two rear surfaces of the two supporting structures 35 are recessed inward to form two upper penetrating grooves 351. Two lower portions of the two rear surfaces of the two supporting structures 35 are recessed inward to form two lower penetrating grooves 352. The two opposite sides of the one roller 33 pass through the two upper penetrating grooves 351 of the two supporting structures 35, and the two opposite sides of the other roller 33 pass through the two lower penetrating grooves 352 of the two supporting structures 35.

Specifically, the two upper fastening pillars 3311 of the upper roller 331 pass through the two upper penetrating grooves 351. The two lower fastening pillars 3321 of the lower roller 332 pass through the two lower penetrating grooves 352. In the preferred embodiment, an aperture diameter of the upper penetrating groove 351 is bigger than an aperture diameter of the lower penetrating groove 352. The two lower fastening pillars 3321 of the lower roller 332 are fastened in the two lower penetrating grooves 352. The two upper fastening pillars 3311 of the upper roller 331 are movable disposed in the two upper penetrating grooves 351. The two upper fastening pillars 3311 of the upper roller 331 are movable in the two upper penetrating grooves 351 along the up-down direction. The two upper corresponding segments of the two supporting structures 35 are the two upper penetrating grooves 351.

The circuit board assembly 4 has a clamping slot 41 penetrating through a middle of a front of the circuit board assembly 4. The clamping slot 41 is located behind the protective mechanism 3. Several portions of two side edges of the circuit board assembly 4 are recessed inward to form a plurality of limiting slots 401. The plurality of limiting blocks 104 are limited in the plurality of the limiting slots 401. The rear end of the inserting passageway 13 of the upper shell 1 is located to two fronts of the two bevels 306. The rear ends of the upper extending portion 11 and the lower extending portion 12 are located to the two fronts of the two bevels 306. The clamping slot 41 is corresponding to the second inserting slot 321 of the rear cover 32, the outlet end 313, the abutting position or the inserting space 307 between the two rollers 33, the first inserting slot 311 and the inserting end 312 of the front cover 31, and the inserting passageway 13 of the upper shell 1.

Referring to FIG. 1 to FIG. 14, when the card 200 is without being inserted into the card reader with the protective mechanism 100, the two rollers 33 contact with each other, the lower main portion 3320 of the lower roller 332 contacts with the upper main portion 3310 of the upper roller 331 along the up-down direction, the two rollers 33 are covered to the first inserting slot 311 of the front cover 31 and the second inserting slot 321 of the rear cover 32. The two rollers 33 are blocked between the first inserting slot 311 and the second inserting slot 321. The two rollers 33 block dusts, liquids or extraneous materials from invading into the card reader with the protective mechanism 100. The two springs 34 are located at original statuses.

When the card 200 is inserted into the card reader with the protective mechanism 100, the card 200 is inserted into the inserting passageway 13 of the upper shell 1, and the card 200 passes through the first inserting slot 311, the card 200 pushes against the upper main portion 3310 of the upper roller 331 and the lower main portion 3320 of the lower roller 332, the card 200 resists against the upper roller 331 to make the upper roller 331 move upward, the upper roller 331 is separated from the lower roller 332 to form the inserting space 307 between the upper roller 331 and the lower roller 332, the upper main portion 3310 of the upper roller 331 abuts against a top surface of the card 200, and the lower main portion 3320 of the lower roller 332 abuts against a bottom surface of the card 200. So, the two rollers 33 are separated from each other. The two springs 34 are compressed by the upper roller 331. The upper roller 331 rotates in an anticlockwise direction to decrease a friction between the card 200 and the upper roller 331. The lower roller 332 rotates in a clockwise direction to decrease a friction between the card 200 and the lower roller 332. A friction between the two rollers 33 and the card 200 is reduced. The upper roller 331 and the lower roller 332 clean the dusts or the liquids of the card 200.

The clamping slot 41 is corresponding to the second inserting slot 321 of the rear cover 32, the outlet end 313, the inserting space 307, the first inserting slot 311 of the front cover 31 and the inserting passageway 13 of the upper shell 1. When the two rollers 33 are separated from each other, the clamping slot 41 is communicated with the inserting passageway 13 of the upper shell 1, the first inserting slot 311 of the front cover 31, the outlet end 313, the inserting space 307 and the second inserting slot 321 of the rear cover 32. The clamping slot 41 is in alignment with the inserting passageway 13 of the upper shell 1, the first inserting slot 311 of the front cover 31, a middle of the outlet end 313, the inserting space 307 and the second inserting slot 321 of the rear cover 32. The card 200 is inserted into the clamping slot 41 through the inserting passageway 13 of the upper shell 1, the first inserting slot 311 of the front cover 31, the inserting space 307 and the second inserting slot 321 of the rear cover 32.

When the card 200 is pulled out from the circuit board assembly 4, the upper roller 331 rotates clockwise to decrease the friction between the upper roller 331 and the card 200, and the lower roller 332 rotates anticlockwise to decrease the friction between the lower roller 332 and the card 200, so the friction between the two rollers 33 and the card 200 is reduced. When the card 200 is pulled out of the two rollers 33, the two springs 34 restore to the original statuses, the upper roller 331 and the lower roller 332 are automatically rebounded, and the upper roller 331 abuts against the lower roller 332.

As described above, the card reader with the protective mechanism 100 is conveniently maintained by removing the lower shell 2 and the rear cover 32 to replace the two rollers 33, the rear ends of the upper extending portion 11 and the lower extending portion 12 of the upper shell 1 are surrounded by the front cover 31, the inserting passageway 13 of the upper shell 1, the first inserting slot 311 and the second inserting slot 321 are positioned in the front cover 31 to make the inserting passageway 13 aligns with the first inserting slot 311 and the second inserting slot 321, so the insertion position deviation of the card 200 is prevented to prevent the card reader with the protective mechanism 100 colliding with the card 200 to affect the usage life. Furthermore, the protective mechanism 3 is disposed to the front end of the circuit board assembly 4 to make the circuit board assembly 4 be away from the inserting space 307 of the two rollers 33 which is disposed in the shell 10, after the card 200 passes through the inserting space 307, the card 200 passes through a longer route to be inserted to the clamping slot 41 by the shell 10, and the shell 10 blocks the electronic component of the circuit board assembly 4 from contacting the card 200, consequently, the card 200 and the two rollers 33 hardly collide with the electronic component to avoid a damage of the card 200. In addition, the third chamfer 314 prevents the front cover 31 colliding with the upper extending portion 11 and the lower extending portion 12 of the upper shell 1 to cause the damage of the front cover 31, and the upper extending portion 11 and the lower extending portion 12 of the upper shell 1, when the card 200 is inserted into the card reader with the protective mechanism 100, the two springs 34 are compressed by the upper roller 331, the upper roller 331 moves upward, the upper roller 331 rotates anticlockwise, and the lower roller 332 rotates clockwise, so the friction between the two rollers 33 and the card 200 is reduced. As a result, the card reader with the protective mechanism 100 is able to increase the usage life of the card reader with the protective mechanism 100, conveniently replace the protective mechanism 3 and prevent the extraneous materials invading into the card reader with the protective mechanism 100.

What is claimed is:

1. A card reader with a protective mechanism, comprising:
   an upper shell, a bottom of the upper shell being opened freely, the upper shell having an inserting passageway longitudinally penetrating through a front end of the upper shell;
   a lower shell disposed to a bottom surface of the upper shell to form an accommodating space between the upper shell and the lower shell, the accommodating space being communicated with the inserting passageway;
   a protective mechanism disposed between the upper shell and the lower shell, and the protective mechanism being accommodated in the accommodating space, the protective mechanism having:
   a front cover having a top wall, a bottom wall, and an isolating wall connected with two inner surfaces of the top wall and the bottom wall, two opposite sides of a rear surface of the isolating wall extending rearward to form two isolating ribs, respectively, two opposite sides of a rear surface of the top wall, two opposite sides of a rear surface of the bottom wall and two inner sides of two rear surfaces of the two isolating ribs being recessed inward to form a plurality of restricting slots, the front cover having a first inserting slot penetrating through a middle of a front surface and a rear surface of the front cover;
   a rear cover covered to a rear of the front cover, a middle of the rear cover having a second inserting slot penetrating through a front surface and a rear surface of the rear cover;
   two rollers received in the front cover and disposed along an up-down direction;
   two springs elastically abutting between two sides of the inner surface of the top wall of the front cover and two opposite sides of one roller along a vertical direction, the two rollers being driven by the two springs along the vertical direction, the one roller abutting against the other roller along the vertical direction to form an abutting position between the two rollers, or the one roller being separated from the other roller along the vertical direction to form an inserting space between the two rollers;
   two supporting structures mounted around the two opposite sides of the one roller, and two opposite sides of the other roller; and
   a plurality of sealing structures disposed at two outer surfaces of the two supporting structures, the plurality of the sealing structures being fastened in the plurality of the restricting slots, the two rollers, the two springs, the two supporting structures and the plurality of the sealing structures being disposed between the front cover and the rear cover; and
   a circuit board assembly disposed between the upper shell and the lower shell, and the circuit board assembly being accommodated in the accommodating space, the protective mechanism being disposed to a front end of the circuit board assembly, the circuit board assembly having a clamping slot penetrating through a middle of a front of the circuit board assembly;
   wherein the clamping slot is corresponding to the second inserting slot, the abutting position or the inserting space between the two rollers, the first inserting slot and the inserting passageway.

2. The card reader with the protective mechanism as claimed in claim 1, wherein the two rollers include an upper roller and a lower roller, the upper roller has an upper main portion and two upper fastening pillars, two middles of two opposite side surfaces of the upper main portion extend outward to form the two upper fastening pillars, respectively, a diameter of two circular surfaces of the upper main portion is bigger than a diameter of a circular surface of each upper fastening pillar.

3. The card reader with the protective mechanism as claimed in claim 2, wherein the lower roller has a lower main portion and two lower fastening pillars, two middles of two opposite side surfaces of the lower main portion extend outward to form the two lower fastening pillars, respectively, a diameter of two circular surfaces of the lower main portion is bigger than a diameter of a circular surface of each lower fastening pillar.

4. The card reader with the protective mechanism as claimed in claim 3, wherein a rear end of the front cover defines an outlet end penetrating through the rear surface of the front cover, a middle of the front surface of the rear cover is recessed rearward to form a concave surface, the upper main portion is corresponding to an upper portion of the outlet end and an upper portion of the concave surface, the lower main portion is corresponding to a lower portion of the outlet end and a lower portion of the concave surface, the two upper fastening pillars abut against two upper portions of two inner surfaces of the two supporting structures, the two lower fastening pillars abut against two lower portions of the two inner surfaces of the two supporting structures.

5. The card reader with the protective mechanism as claimed in claim 4, wherein two areas between the top wall and the two isolating ribs define two first fastening grooves, two areas between the bottom wall and the two isolating ribs define two second fastening grooves, the two second fastening grooves are disposed under the two first fastening grooves, the two upper fastening pillars are disposed in the two first fastening grooves, the two lower fastening pillars are disposed in the two second fastening grooves.

6. The card reader with the protective mechanism as claimed in claim 5, wherein two opposite sides of a rear surface of the isolating wall are recessed frontward to form two concave portions, respectively, the two concave portions extend upward to the inner surface of the top wall, and the two concave portions extend downward to the inner surface of the bottom wall, the two concave portions are communicated with the outlet end, the two concave portions are disposed between the first fastening grooves and the second fastening grooves of the two opposite sides of the rear surface of the isolating wall, the two supporting structures are received in the two concave portions.

7. The card reader with the protective mechanism as claimed in claim 6, wherein the plurality of the restricting slots are disposed at top end walls of the plurality of the first fastening grooves and bottom end walls of the plurality of the second fastening grooves, the plurality of the restricting slots extend to two outer sides of the two concave portions, the plurality of the restricting slots are communicated with the two concave portions, the plurality of the restricting slots are corresponding to the plurality of the sealing structures.

8. The card reader with the protective mechanism as claimed in claim 5, wherein two upper portions of two opposite sides of the rear surface of the top wall are recessed inward to form two assembling grooves, respectively, the two assembling grooves are disposed to two tops of the two first fastening grooves, the two assembling grooves are communicated with the two first fastening grooves, the two springs are disposed in the two assembling grooves, the two springs abut against the two upper fastening pillars of the upper roller, two opposite inner side surfaces of each assembling groove protrude inward to form two fastening ridges, respectively, when each assembling groove is assembled with one spring, the two fastening ridges of each assembling groove are fastened to one end of the one spring.

9. The card reader with the protective mechanism as claimed in claim 8, wherein an upper portion and a lower portion of each fastening ridge gradually shrink inward from an outer side of the fastening ridge to an inner side of the fastening ridge.

10. The card reader with the protective mechanism as claimed in claim 5, wherein each supporting structure has an upper penetrating groove, and a lower penetrating groove disposed under the upper penetrating groove, two upper portions of two rear surfaces of the two supporting structures are recessed inward to form two upper penetrating grooves, two lower portions of the two rear surfaces of the two supporting structures are recessed inward to form two lower penetrating grooves, an aperture diameter of the upper penetrating groove is bigger than an aperture diameter of the lower penetrating groove, the two upper fastening pillars of the upper roller pass through the two upper penetrating grooves, the two lower fastening pillars of the lower roller pass through the two lower penetrating grooves.

11. The card reader with the protective mechanism as claimed in claim 1, wherein the top wall is disposed opposite to the bottom wall along the up-down direction, the first inserting slot extends in the isolating wall along a transverse direction, a front end of the front cover defines an inserting end penetrating through a front surface of the front cover, a rear end of the front cover defines an outlet end penetrating through the rear surface of the front cover, the inserting end and the outlet end are isolated by the isolating wall, the isolating wall is located behind the inserting end, and the outlet end is located behind the isolating wall, the inserting end is close to a rear end of the inserting passageway, the outlet end is close to the front end of the circuit board assembly.

12. The card reader with the protective mechanism as claimed in claim 11, wherein an upper portion of the front end of the upper shell slantwise extends downward and rearward, and then is bent rearward to form an upper extending portion, a lower portion of the front end of the upper shell extends rearward to form a lower extending portion, the upper extending portion is spaced from the lower extending portion to form the inserting passageway between the upper extending portion and the lower extending portion, the inserting passageway is communicated with the first inserting slot, two sides of the upper extending portion are bent downward, and two sides of the lower extending portion are bent upward, the two sides of the upper extending portion are connected with the two sides of the lower extending portion, respectively, the front cover has two lateral walls connected with two sides of the top wall and two sides of the bottom wall, rear ends of the upper extending portion and the lower extending portion are inserted into the inserting end, the upper extending portion abuts against an upper portion of an inner surface of the inserting end, the upper extending portion abuts against an upper portion of a front surface of the isolating wall and the inner surface of the top wall, the lower extending portion abuts against a lower portion of the inner surface of the inserting end, the lower extending portion abuts against a lower portion of the front surface of the isolating wall and the inner surface of the bottom wall, two upper portions of two inner surfaces of the two lateral walls cover two outer surfaces of the two sides of the upper extending portion, two lower portions of the two inner surfaces of the two lateral walls cover two outer surfaces of the two sides of the lower extending portion.

13. The card reader with the protective mechanism as claimed in claim 12, wherein an outer portion of the rear end of the upper extending portion slantwise extends inward and rearward to form a first chamfer, an outer portion of the rear end of the lower extending portion slantwise extends inward and rearward to form a second chamfer, a front end of an inner peripheral wall of the inserting end slantwise extends inward and rearward to form a third chamfer, the third chamfer is corresponding to the first chamfer and the second chamfer.

14. The card reader with the protective mechanism as claimed in claim 12, wherein the lower shell has a base board, and a peripheral wall protruded upward from a periphery of the base board, a front end of a top surface of the base board extends upward to form a first supporting portion, a middle of the top surface of the base board extends upward to form a second supporting portion, the first supporting portion is disposed under the lower extending portion of the upper shell, the second supporting portion is disposed under a top of the circuit board assembly.

15. The card reader with the protective mechanism as claimed in claim 14, wherein the lower shell has a first mounting portion and a second mounting portion, the first mounting portion is formed between a rear surface of the first supporting portion and a front surface of the second supporting portion, the protective mechanism is fastened in the first mounting portion, a middle of the second supporting portion defines the second mounting portion, the second mounting portion is corresponding to the circuit board assembly, the circuit board assembly is disposed to the second mounting portion.

16. A card reader with a protective mechanism, comprising:
   a shell, a front end of the shell having an inserting passageway longitudinally penetrating through a front surface of the shell;
   a protective mechanism enclosed by the shell, a front end of the protective mechanism surrounding a rear end of the inserting passageway, the protective mechanism having:
      a front cover having a first inserting slot penetrating through a middle of a front surface and a rear surface of the front cover, two front ends of an upper wall and a lower wall of the first inserting slot slantwise extending inward and rearward to form two bevels, the rear end of the inserting passageway being located to two fronts of the two bevels;
      a rear cover covered to a rear of the front cover, a middle of the rear cover having a second inserting slot penetrating through a front surface and a rear surface of the rear cover;
      two rollers disposed between the front cover and the rear cover, the two rollers including an upper roller and a lower roller which are disposed along an up-down direction, the upper roller having an upper main portion, two middles of two opposite side surfaces of the upper main portion extending outward to form two upper fastening pillars, respectively, the lower roller having a lower main portion, two middles of two opposite side surfaces of the lower main portion extending outward to form two lower fastening pillars, respectively;
      two springs disposed between the front cover and the rear cover, the two springs elastically abutting between two sides of an inner surface of a top of the front cover and the two upper fastening pillars; and
      two supporting structures disposed between the front cover and the rear cover, each supporting structure having an upper penetrating groove, and a lower penetrating groove disposed under the upper penetrating groove, two upper portions of two rear surfaces of the two supporting structures being recessed inward to form two upper penetrating grooves, two lower portions of the two rear surfaces of the two supporting structures being recessed inward to form two lower penetrating grooves, the two upper fastening pillars passing through the two upper penetrating grooves, two opposite side surfaces of the upper main portion abutting against two upper portions of two inner surfaces of the two supporting structures, the two lower fastening pillars passing through the two lower penetrating grooves, two opposite side surfaces of the lower main portion abutting against two lower portions of the two inner surfaces of the two supporting structures; and
   a circuit board assembly enclosed by the shell, the protective mechanism being disposed to a front end of the circuit board assembly, the circuit board assembly having a clamping slot penetrating through a middle of a front of the circuit board assembly;
   wherein when a card is without being inserted into the card reader with the protective mechanism, the lower main portion of the lower roller contacts with the upper main portion of the upper roller along the up-down direction, the two rollers are blocked between the first inserting slot and the second inserting slot, the two springs being located at original statuses; and
   wherein when the card is inserted into the card reader with the protective mechanism, the card is inserted into the inserting passageway, and the card passes through the first inserting slot, the card resists against the upper roller to make the upper roller move upward, the upper roller is separated from the lower roller to form an inserting space between the upper roller and the lower roller, the two springs are compressed by the upper roller, the clamping slot is communicated with the inserting passageway, the first inserting slot, the inserting space and the second inserting slot, the clamping slot is in alignment with the inserting passageway, the first inserting slot, the inserting space and the second inserting slot, the card is inserted into the clamping slot.

17. The card reader with the protective mechanism as claimed in claim 16, wherein a diameter of two circular surfaces of the upper main portion is bigger than a diameter of a circular surface of each upper fastening pillar, a diameter of two circular surfaces of the lower main portion is bigger than a diameter of a circular surface of each lower fastening pillar, an aperture diameter of the upper penetrating groove is bigger than an aperture diameter of the lower penetrating groove.

18. A card reader with a protective mechanism, comprising:
   a shell, a front end of the shell having an inserting passageway penetrating through the shell;
   a protective mechanism disposed in the shell, a front end of the protective mechanism surrounding a rear end of the inserting passageway, the protective mechanism having:
      a front cover having an inserting end penetrating through a front surface of the front cover, an outlet end penetrating through a rear surface of the front cover, and a first inserting slot defined in the front cover and communicated between the inserting end and the outlet end;
      a rear cover covering the outlet end, the rear cover having a second inserting slot penetrating through a front surface and a rear surface of the rear cover;
      an elastic unit disposed in the outlet end; and
      two rollers disposed in the outlet end along an up-down direction, the elastic unit elastically abutting between an inner surface of a top of the front cover and one roller along a vertical direction, the two rollers being disposed between the first inserting slot and the second inserting slot, the two rollers being driven by the elastic unit to abut against each other or be separated from each other, the two rollers abutting against each other along the vertical direction to form an abutting position between the two rollers to isolate the first inserting slot from the second inserting slot, or the two rollers being separated from each other along the vertical direction to form an inserting space between the two rollers; and a circuit board assembly disposed in the shell, the circuit board assembly being disposed to a rear end of the protective mechanism, the circuit board assembly having a clamping slot, the clamping slot being located behind the protective mechanism;

wherein the clamping slot is corresponding to the second inserting slot, the outlet end, the abutting position or the inserting space between the two rollers, the first inserting slot, and the inserting passageway, when the two rollers are separated from each other, the clamping slot is communicated with the inserting passageway, the first inserting slot, the outlet end, the inserting space and the second inserting slot.

19. The card reader with the protective mechanism as claimed in claim 18, wherein the shell includes an upper shell and a lower shell disposed to a bottom surface of the upper shell, the lower shell has a base board, and a peripheral wall protruded upward from a periphery of the base board, several portions of an inner peripheral surface of the upper shell are recessed opposite to the circuit board assembly to form a plurality of buckling grooves, several portions of a top of the peripheral wall protrude upward to form a plurality of buckling blocks, when the lower shell is assembled to the upper shell, the plurality of the buckling blocks are buckled in the plurality of the buckling grooves.

20. The card reader with the protective mechanism as claimed in claim 19, wherein several portions of two inner surfaces of two sides of the upper shell protrude inward to form a plurality of limiting blocks extending along the up-down direction, several portions of two side edges of the circuit board assembly are recessed inward to form a plurality of limiting slots, the plurality of limiting blocks are limited in the plurality of the limiting slots.

* * * * *